United States Patent [19]

Fromme

[11] 4,166,303
[45] Sep. 4, 1979

[54] DRY WIPING SYSTEM FOR AUTOMOBILES

[75] Inventor: Richard H. Fromme, Rancho Mirage, Calif.

[73] Assignee: Daniel C. Hanna, Portland, Oreg.

[21] Appl. No.: 850,679

[22] Filed: Nov. 11, 1977

[51] Int. Cl.² .............................................. B60S 3/06
[52] U.S. Cl. ................................. 15/97 A; 15/DIG. 2
[58] Field of Search .......................... 15/DIG. 2, 97 B

[56] References Cited

U.S. PATENT DOCUMENTS

| 3,499,180 | 3/1970 | Hurwitz | 15/97 B |
| 3,510,898 | 5/1970 | Tatara et al. | 15/97 B X |
| 3,914,818 | 10/1975 | Fromme | 15/97 B |

Primary Examiner—Edward L. Roberts
Attorney, Agent, or Firm—Christensen, O'Connor, Johnson & Kindness

[57] ABSTRACT

A dry wiping system for use in a mechanized car wash establishment in which an automobile moves along a defined path comprises a series of strips of water absorbent material suspended from a carrier above the path of the automobile. The carrier, which moves the strips so that they wipe across the wet exterior surfaces of the automobile, is guided along a circuit which causes the strips to be carried across the path of the automobile at an angle such that the strips have a substantial component of motion in a direction opposite the motion of the automobile substantially throughout each traverse of the path. Preferably, the circuit of motion is of triangular form and the system also includes a pair of power driven wringer rollers positioned to receive the strips after they have passed across the automobile to dewater the strips prior to their next excursion across the automobile.

17 Claims, 7 Drawing Figures

DRY WIPING SYSTEM FOR AUTOMOBILES

BACKGROUND OF THE INVENTION

This invention relates to mechanized car washing and drying systems and more particularly to an improved drying mechanism that may be used effectively in such systems.

In most automatic car washing facilities presently in commercial operation, a conveyor mechanism advances the vehicle through a tunnel-like facility in which successively located devices are actuated by the vehicle and cause it to be wetted down, scrubbed with a detergent solution, rinsed, and finally dried. Several prior art car washing and drying systems use blowers to supply high pressure air to nozzles directed at the car to blow away excess water and to speed evaporation. This method of drying is inefficient in that it leaves enough water on the car to require a manual wipedown. This method also requires a large horsepower motor to operate the blowers, thereby using great amounts of electrical energy.

Other prior art washing and drying systems such as in U.S. Pat. Nos. 3,510,893 and 3,683,441 remove rinse water from vehicles by overhead carriers mechanically sweeping or drawing strips of absorbent material across the wet surfaces of the vehicle. This method of drying is more effective and more efficient than blower dryers but when practiced in elemental form requires frequent laundering of the absorbent strips and attendant down time while replacing dirt clogged strips with clean ones. This latter problem is largely solved by mechanically wringing the strips one or more times on each circuit, especially if preceded by a jet spray rinse, as in my U.S. Pat. No. 3,914,818, issued Oct. 28, 1975.

A remaining disadvantage of the prior art dry wiping systems concerns the tendency of the circulating suspended absorbent strips to catch on the ends of the windshield wiper blades of some automobiles, detaching or damaging the blades and sometimes the wiper blade arms. Prior attempts to solve this problem focused principally on increasing the speed of the auto conveyor and/or reducing the rotational velocity of the wiper strip carrier. Such measures have been unsatisfactory, however, because the relative speed settings necessary to minimize wiper damage usually differed considerably from those required to maximize the working efficiency of a given installation. In the case of a rotary carrier moving the strips in a circular path about a central vertical axis, attempts to alleviate wiper damage by the technique of decreasing the diameter of the rotor assembly presented problems in that the wiper strips failed to drop off the sides of the car during circulatory motion, hence failed to make proper contact with side surfaces of the cars. Also, problems were experienced in achieving consistent engagement with the wringer device. On the other hand, increasing the carrier rotor diameter unduly preempts working space along the conveyor run without commensurate effectiveness in drying the cars. Since many such washing establishments are run in conjunction with other businesses on expensive real estate, for example, a gasoline filling station or an automotive repair shop, space is usually at a premium. Hence a drier that occupies excessive space unduly increases the cost of doing business.

It is therefore an object ot the present invention to provide a new and improved wiper drying apparatus for use in mechanized automobile washing and drying establishments. It is a further object of the present invention to provide a wiper drying apparatus which, with achieving improved drying efficiency, substantially eliminates the problem of breaking and/or bending windshield wiper blades on vehicles being washed and dried. It is a still further object of this invention to provide such a wiper drying apparatus that takes up a minimum of space lengthwise of the car conveyor and that provides a strip carrier arrangement with capacity to accommodate a greater number of absorbent strips to be used in the same or less space as the prior art drying machines.

Still other objects relate to providing mechanical construction and operating advances including improved strip mounting means that securely yet releasably holds the wiping strips suspended from the carrier means and that controls the orientation of the strips both during the traverse cross the car and also when they are being swung clear at the ends of the sweep. As a result improved wiping effectiveness and efficient entry of the wiping strips in the wringer mechanism are attained.

SUMMARY OF THE INVENTION

In accordance with the foregoing objects, the wiper strips are circulated in a specially configured path that includes at least one substantially straight traversing sweep partially angled against the direction of advance of the car. At the end of such traversing sweep the strips drop free of the car and execute a suitable turn in the path leading to the next traversing sweeping. During such turn the strips are srung of water, with or without spray rinsing. With this new system velocities of the strip carrier and of the automobile conveyor may be varied relatively as desired to achieve efficient production without experiencing the former windshield wiper damage problem. The angled traversing sweep of the carriers achieves this result as long as there is a substantial motion vector of the strips opposite the direction of motion of the auto. As a result the wiper strips encounter and are dragged across the windshield wipers and arms from a broadside aspect rather than merely endwise of such windshield wipers, with attendant reduction of damage problems encountered heretofore.

Preferably, the carrier means comprises a chain which moves in a horizontal substantially triangular circuit that extends beyond the sides of the path of the auto, the traversing sweep motion following the inclined sides of the triangle each being angled against the direction of vehicle advancement. The wiper strips are detachably fastened to heavyweight suspender strips, such as polypropylene carpeting which in turn are looped over support bars secured to elements on the carrier chain. In the traversing sweeps, the aformentioned suspender strips are oriented by their upper ends in nearly coplanar relationship. At the turns, however, the chain rounds sprockets or other turning guides and the suspender strips change orientation relative to the line of motion; conducive to appropriate entry of the wiper strips into the wringer device.

BRIEF DESCRIPTION OF THE DRAWINGS

The above-mentioned features, objects and advantages of the invention will become more fully evident from the following description with reference to the accompanying drawings, wherein:

FIG. 4 is an isometric view of a wiping strip made in accordance with the principles of this invention attached to the dry wiping apparatus of FIG. 1;

FIG. 5 is an isometric view of an alternate means of attaching the wiping strip of FIG. 4 to the dry wiping apparatus; and, FIG. 6 is a plan view of a dry wiping apparatus having the wiping strips attahced according to the means shown in FIG. 5.

DETAILED DESCRIPTION OF THE PREFERRED EMBODIMENT

Figure 1:
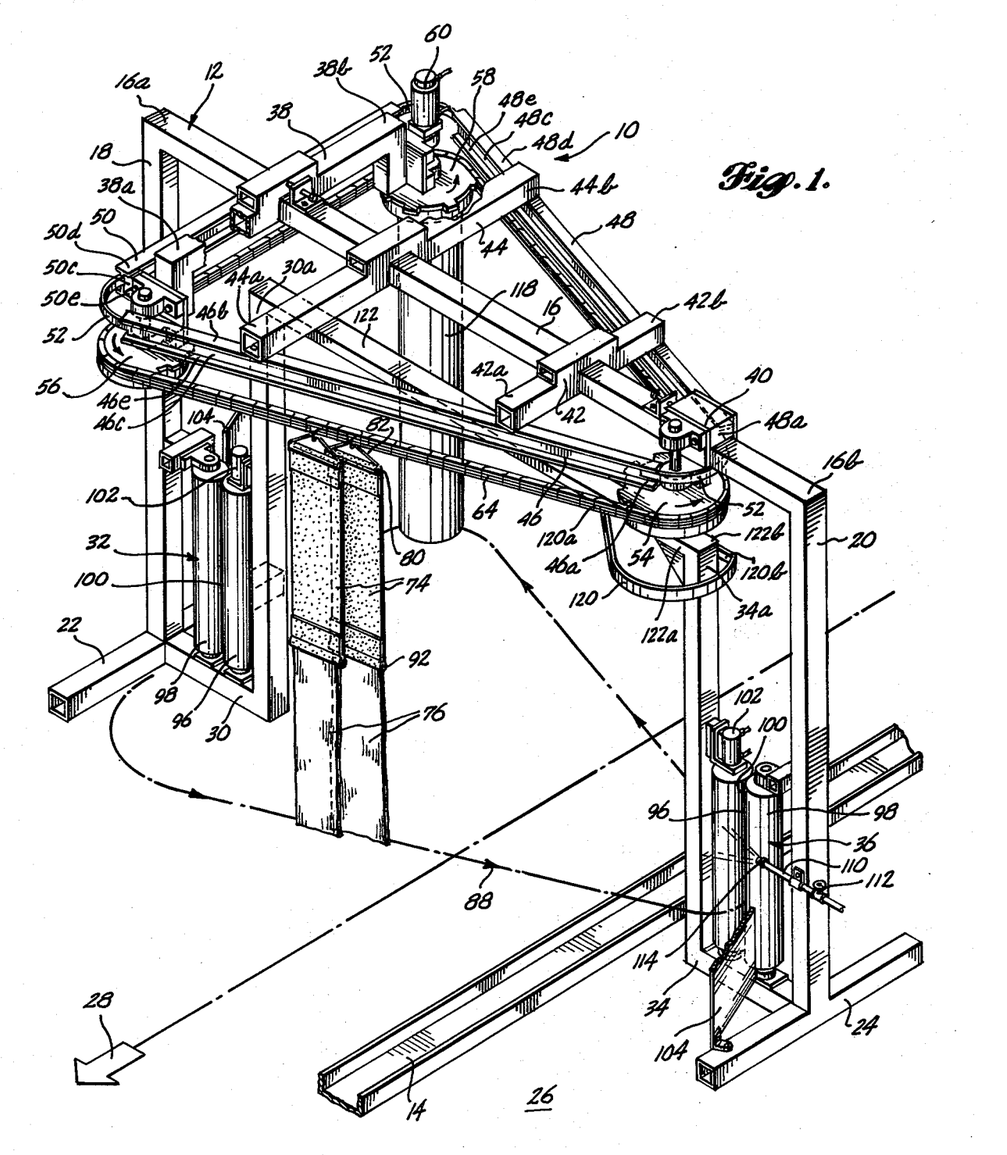
FIG. 1 is an isometric view of a dry wiping device made in accordance with the principles of this invention.
Figure 2:
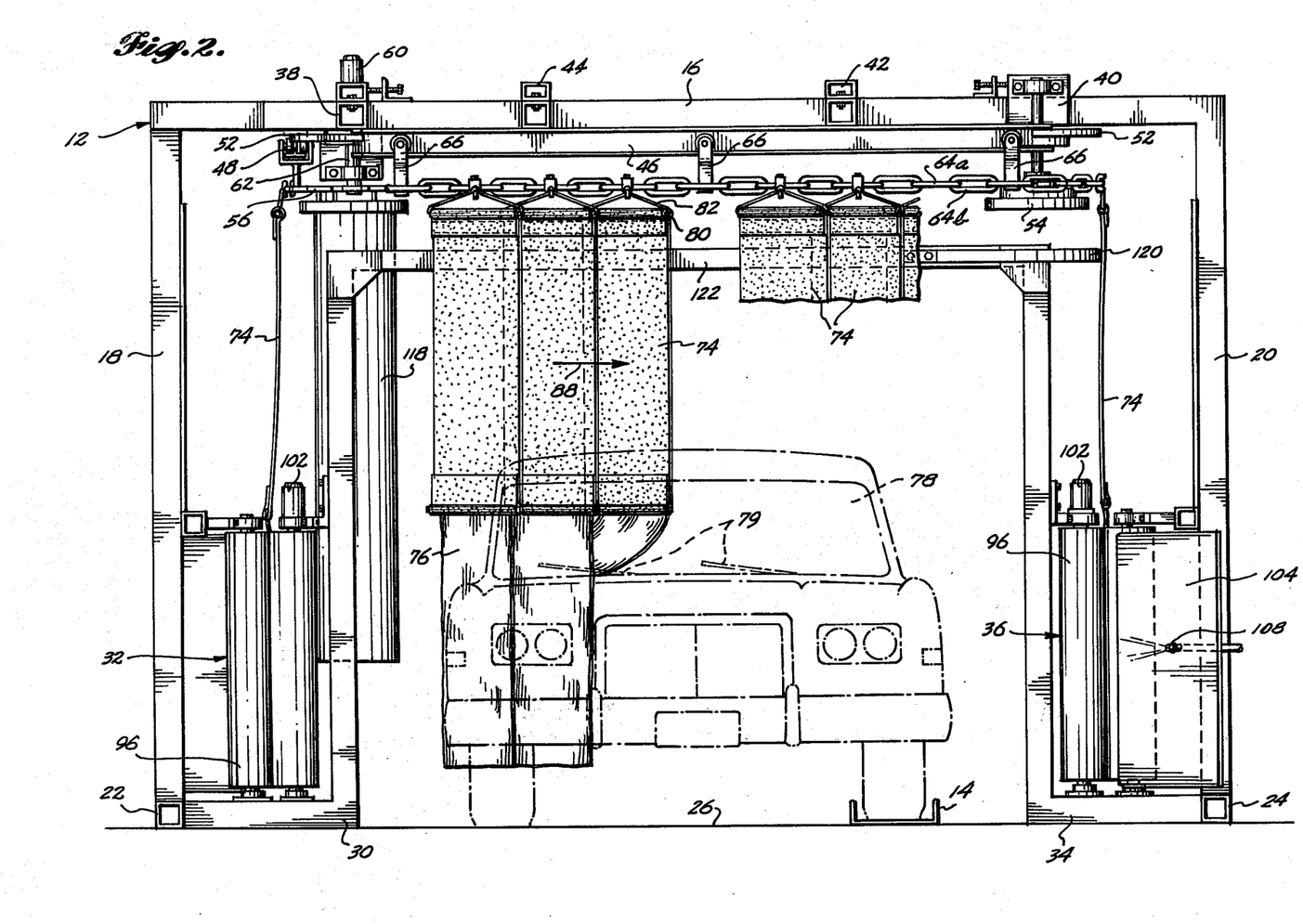
FIG. 2 is a plan view of the dry wiping device of FIG. 1 as viewed from the exit end of the car wash establishment.
Figure 3:
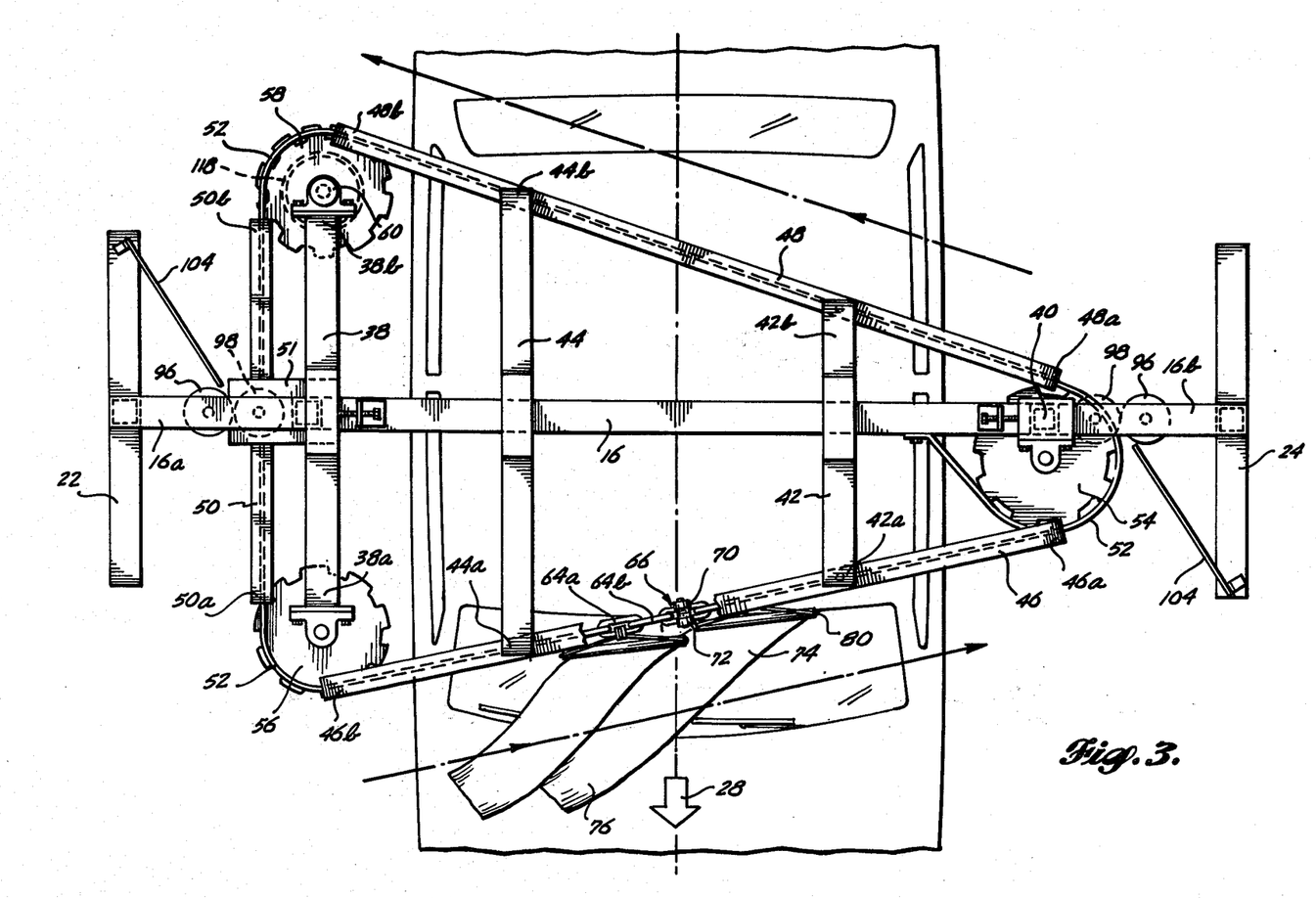
FIG. 3 is a plan view of a dry wiping apparatus made in accordance with the principles of this invention.

Referring to FIGS. 1 and 2, the dry wiping system 10 comprises a support frame 12 which overarches an automobile conveyor 14. The frame 12 comprises an elevated horizontal beam 16 supported at its ends by vertical posts 18 and 20 mounted respectively on stabilizing feet 22 and 24 which rest on and are secured to the floor 26 adjacent opposite sides of the automobile path of advancement through the system as shown by an arrow 28. An L-shaped beam portion 30, attached to the lower extremity of one vertical post 18 and residing in the plane of the overhead horizontal beam 16, cooperates with the vertical post 18 to provide mounting for the elements of a wringer assembly 32. A similar L-shaped beam 34 is attached to the vertical post 20 on the opposite side of the automobile path 28 to provide a mounting for a second wringer assembly 36. The wringer assemblies 32 and 36 will be described in further detail below.

A sprocket support beam 38 is mounted on the horizontal beam 16 transversely to the elongate dimension of the horizontal beam 16 and adjacent a first end 16a of the horizontal beam 16 which connects to the vertical post 18. A sprocket support assembly 40 is slidably mounted on the horizontal beam 16 adjacent a second end 16b of the horizontal beam for movement along the extension of the horizontal beam 16. A first track support beam 42 is mounted on the horizontal beam 16 and is oriented transversely to the horizontal beam between the sprocket support 40 and the center of horizontal beam 16. A second track support beam 44, longer than the first track support beam 42, is mounted on the horizontal beam 16 parallel to the first track support beam 42 and is located between the center of the horizontal beam 16 and the sprocket support beam 38. A first track section 46 is attached to first ends 42a and 44a of the track support beams 42 and 44 and a second track section 48 is attached to second, opposing ends 42b and 44b of the track support beams 42, 44. A third track section 50 is supported by a track mounting assembly 51 which is in turn attached to the sprocket support beam 38. The third track section 50 lies parallel to the sprocket support beam 38. The three track sections 46, 48 and 50 are I-beams having, respectively, a vertical portion 46c, 48c and 50c, an upper horizontal portion 46d, 48d and 50d and a lower horizontal portion 46e, and 48e and 50e. In assembly, the track sections lie in a horizontal plane and, when viewed in plan, generally define a triangle. The span of the triangle defined by the track portions 46, 48 and 50 is such that the base of the triangle (track section 50) and the apex of the triangle (sprocket wheel 54) are spaced apart a distance greater than the width of an automobile passing through the dry wiping system. The adjacent ends of the track sections 46, 48 and 50 are spaced apart from one another and are joined by arcuate roller guides 52, thereby forming a continuous surface along the vertical protions 46c, 48c and 50c of the track sections and the roller guides 52.

A first sprocket wheel 54 is rotatably suspended from the sprocket support assembly 40. A second sprocket wheel 56 is rotatably suspended from a first end 38a of the sprocket support beam 38, adjacent a second end 46b of the track section 46, and a third sprocket wheel 58 is rotatably suspended from a second, opposing end 38b of the sprocket support beam 38. The sprocket wheels 54, 56 and 58 are mounted to rotate in a common horizontal plane located below and parallel to the plane defined by the track sections 46, 48 and 50. A motor 60, such as an electric motor or a hydraulic motor, is drivingly connected to the sprocket wheel 58 by means of a connecting shaft 62 or other suitable connecting means.

An endless chain 64, comprised of alternating horizontally oriented and vertically oriented links 64a and 64b, respectively, is looped around the sprocket wheels 54, 56 and 58 so that the teeth of the sprocket wheels engage the vertically oriented links 64b of the chain 64. The chain 64 is thereby driven by the motor 60 acting through the sprocket wheel 58. The chain 64 is supported by supporting members 66 located at spaced intervals along the length of the chain 64. Each supporting member 66 comprises a bar 67 which engages a horizontal link 64a and is fastened to the link by a pin 68 which passes through the link and the bar, and by a fork portion 69 which extends from a first end 67a of the bar 67. The legs of the fork portion 69 straddle the portion of track section 46, 48 or 50 immediately above the chain 64. First and second rollers 70 and 72 respectively are rotatably mounted on the forked portions 69 such that the associated vertical portions 46c, 48c or 50c of the track sections are interposed between the first and second rollers 70 and 72. The rollers are supported by the associated lower horizontal portions 46e, 48eor 50e. The arrangemnt of the chain 64, supporting members 66 and track sections 46, 48 and 50 is such that, as the chain 64 is driven by motor 60 and sprocket wheel 58, it is suspended from supporting members 66. The supporting members 66 move along the track supported on the rollers 70, 72. When the chain 64 passes over one of the sprocket wheels 54, 56 or 58, the chain is supported by the sprocket wheel and in turn supports the supporting member 66 which rests on the pin 68. The supporting member 66 is guided around the sprocket wheel by the roller guides 52 until it reaches the next track section at which time the chain again becomes suspended from the supporting members 66.

The chain 64 has suspended from it a series of elongate suspender strips 74 of polypropylene carpeting material approximately twelve inches wide attached at regular intervals to chain 64. Each suspender strip supports a wiper strip 76 of water absorbent, chamois-like material attached to the hanging end. The suspended strips 74 hang to a height from the floor about the same as the height of a passenger car. The wiper strips 76 hang to within about 6 inches of the floor 26. The actual wiping and drying of the car is done by the wiper strips 76 as they pass over the wet surfaces of the car. During operation of the drying apparatus, the flexible stiffness and weight of the heavy carpeting suspender strips 74 hanging from the chain 64 tends to stabilize the positioning of the attached wiper strips 76 relative to the vehicle to be dried, and so act to maximize the effectiveness of the resultant wiping action.

Figures 4, 5, 6:
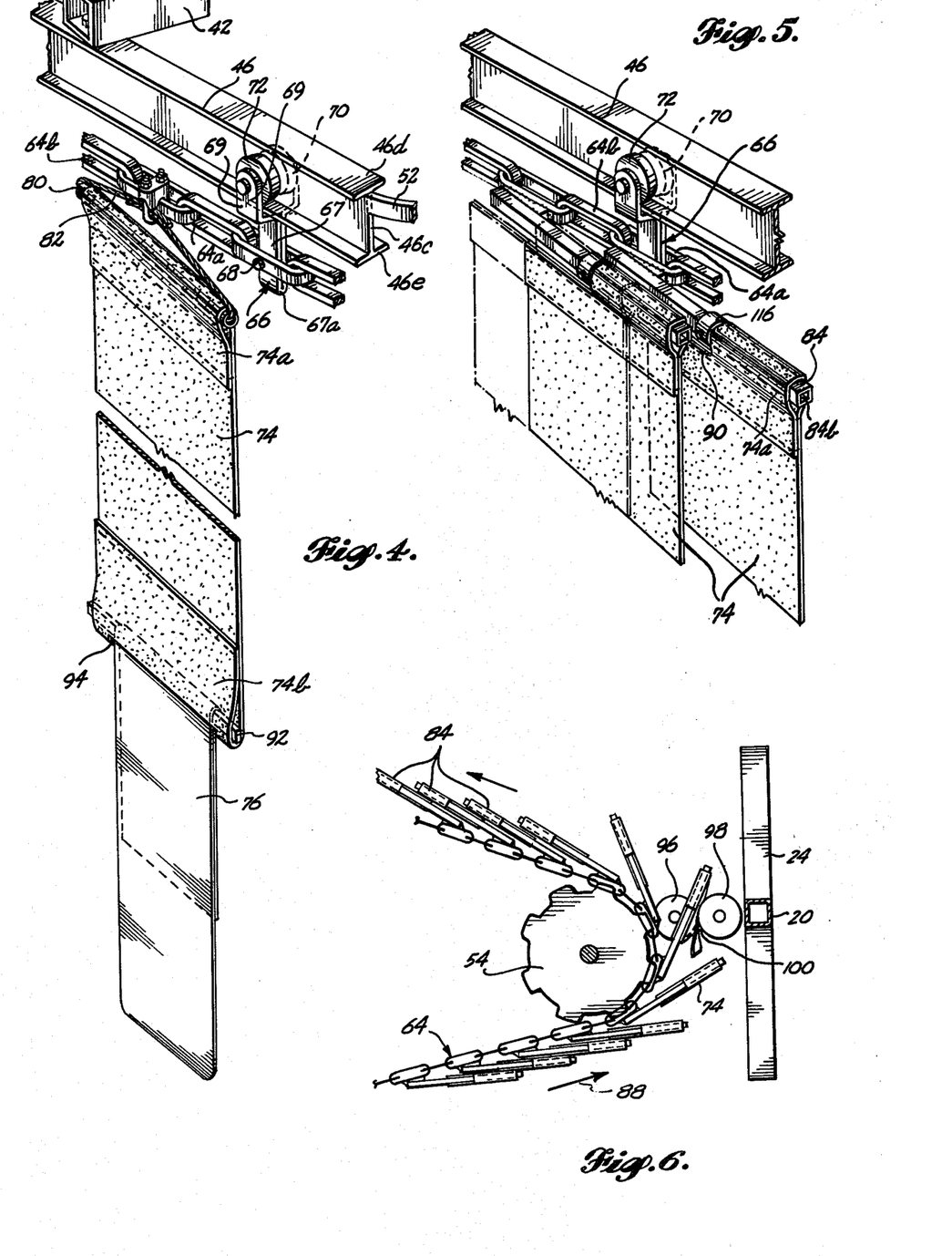

The suspender strips 74 can be attached to the chain 64 by any one of several means. One means of attachment is shown in FIG. 4. A first end 74a of the suspender strip 74 is folded over a tube 80 and the end 74a is sewn to the main body of the suspender strip 74. A cable 82 passes through the tube 80 and the cable ends are clamped to a horizontally oriented link 64a of the chain 64, forming a loop which supports the suspender strip 74. A second means of attachment is shown in FIG. 5. A length of bar material such as square section tubing forms a cantilever arm 84. The arm 84 is welded to the side of a horizontally oriented chain link 64a and extends past the end of the link in the direction of motion of the chain 64, as shown by arrow 88 in FIG. 6. Similar arms are attached to successive horizontal links 64a and arranged so that the succesive cantilever arms are generally parallel to one another when said chain is in the straight portion of its circuit. Each cantilever arm is slightly skewed outward from the plane of the horizontal link 64a to which it is attached. The first end 74a of the suspender strip 74 is folded over and sewn o the main body of the strip to form a loop. The loop slides over the cantilever arm 84. Preferably, a notch 90 is cut in the loop end of the suspender strip 74 adjacent the chain 64. The purpose of the notch 90 will be discussed below. The method of releasably attaching the wiper strip 76 to the suspender strip 74 is also shown in FIG. 4. The hanging end 74b of the suspender strip is folded on itself and fastened to form a second loop. A rod 92 is inserted in the loop end 74b and a slit is cut along the width of the looped end of the suspender strip. The slit 94 does not extend the entire width of the suspender strip but unslit portions remain at the edges of the suspender strip to support the rod 92. The wiper strip 76 loops around the rod 92 and hangs through the slit 94. The wiper strip 76 is fastened to the rod 92 by staples or other suitable means.

In operation, as a car 78 passes beneath the frame 12 on the conveyor 14 as shown in FIG. 2, the chain is being moved along its traingular circuit, carrying the wiper strips 76 across the car 78 and absorbing water from the cars exterior surfaces. Because of the triangular configuration of the track portions 46, 48 and 50, the wiper strips do not cross the car path 28 at right angles but rather obliquely. The exact angle is not critical, so long as the path is such that, as the wiper strips 76 move across the vehicle, there is a substantial motion vector in a direction opposite the direction of motion 28 of the car. Regardless of car velocity or strip velocity the angled path of the wiper strips assures that the wiper strips slide upwardly across the windshield wiper blades rather than endwise against the blades. Thus, the wiper strips sweep the automobile in such a manner as to avoid snagging the wiper strips 76 on the ends of the windshield wipers 79 of the car 78.

After the wiper strips 76 have passed over the car, they pass through the wringer assemblies 32 and 36. The wringer assemblies 32 and 36 are the same as those described in U.S. Pat. No. 3,914,818, incorporated herein by reference. Each of the wringer assemblies 32 and 36 comprises two, right cylindrical, rubber or resiliently compressible synthetic rollers 96 and 98 situated in rolling contact with one another to form a wringer nip 100. The rollers 96, 98 are positioned parallel to one another in a relationship which presses them together so that, as a wiper strip 76 passes between, water is squeezed or rung from the strip by mutual pressure of the rollers at the nip. The roller 96 is driven by a motor 102. The roller 98 in turn is driven by the roller 96 through frictional contact therewith. The wiper strips 76 are guided into the ringer nip 100 of the wringer assembly 32 or 36 by a guide plate 104 fastened to the associated stabilizing foot 22 or 24 of the respective wringer assembly 32 or 36. The guide plate is oriented in a vertical plane angled toward the wringer nip 100.

A hole 108 is formed in each of the guide plates 104 and provides an opening through which a water spray pipe 110 extends to a position adjacent the wringer nip 100. A control valve 112 and a spray nozzle 114 are located on the end of the pipe and are directed to rinse the wiper strips 76 before or as they enter the wringer nip 100. The control valve 112 may be manual or automatic, as desired.

In addition to rinsing the wiper strips free of mud and soilage, water from the spray nozzle 114 also performs the important function of maintaining a minimum level of moisture in the wiper strips 76. The water introduced by the spray pipe 110 compensates for variations in the relative humidity of the ambient air, in start up (dry) conditions, in installation of fresh (dry) strips while others may already be wet, etc. A certain wetness of the chamois material is necessary to its dry wiping a smooth, polished surface.

FIG. 6 is a plan view of a dry wiping apparatus formed in accordance with the principles of this invention and having the suspender strips 74 attached to the chain 64 by the means shown in FIG. 5. From the illustration, it can be seen that when the chain is moving along a straight portion of the circuit, the suspender strips 74 are essentially flat against the chain 64 in interleaved relationship to one another. In this configuration, the carpet strips attack or are incident upon the car path 28 generally edgewise with the advantage that any antenna which may extend above the car can thread its way through the interleaved suspender strips 74 and emerge undamaged. As the chain 64 turns the corners, the cantilever arms 84 and thereby the strips 74 fan out, allowing the wiper strips 76 to pass successively through the wringer nip 100.

When the chain 64 is new, the suspender strip 74 is positioned at a first inboard end 84a of the cantilever arm 84 nearest the chain 64. The suspender strip 74 is kept on the bar by the force of the car against the wiper strips 76 which in turn pushes the suspender strip 74 towards the chain 64. After the dry wiping system has been in operation for a time, the chain 64 will wear and will have to be tightened by removing one or possibly two links. when that is done, the chain will be shorter and the sprocket wheel 54 and the sprocket support 40 are moved toward track support beam 42 to compensate for the shorter chain. With the suspender strip abutting the chain, the wiper strips will not be aligned with the wringer nip 100. Therefore, it is necessary to move the suspender strip toward an outboard end 84b of the cantilever arm 84 an amount sufficient to align the wiper strips 76 with the wringer nip 100. When this is done, a movable stop 116 is mounted on the cantilever arm 84 abutting the inboard edge of the suspender strips 74. As the wiper strips 76 pass across the car, they are pushed in a direction opposite the direction of motion of the chain, thereby pushing the suspender strips against the stop 116. The notch 90 in the suspender strips 74 allows a greater range of adjustment of the suspender strip on the cantilever arm 84 since the main body of the suspender strip can pass beneath the chain 64 when the edge of the notch 90 is pushed against the chain.

Figure 7:
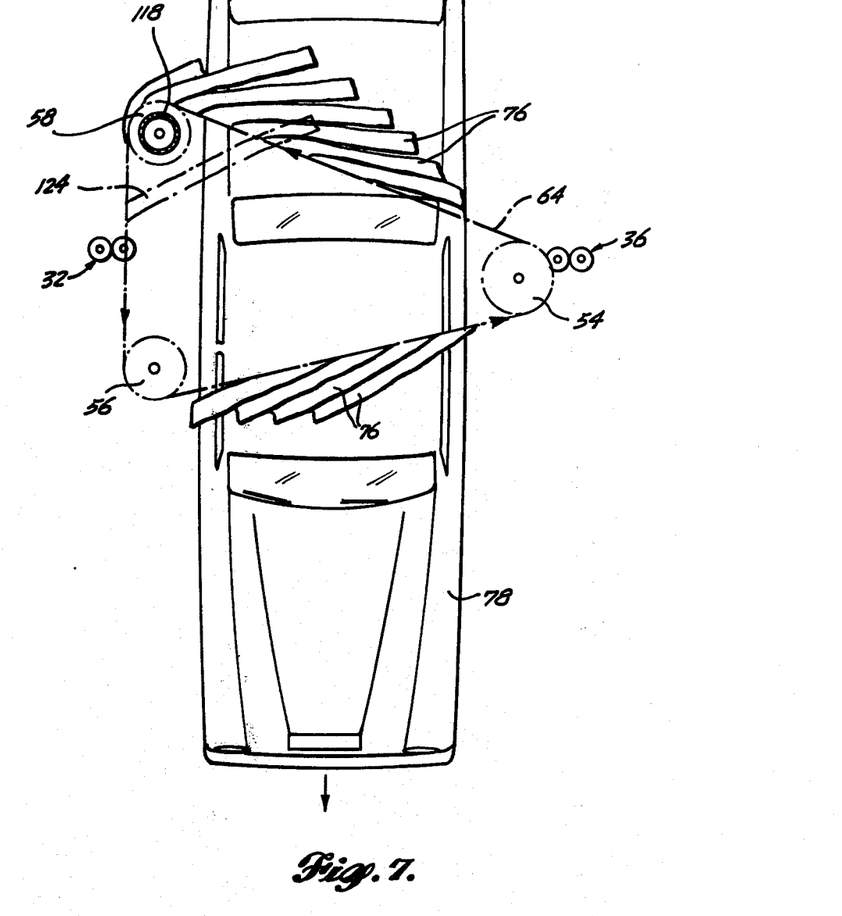
FIG. 7 is a plan view of a dry wiping system formed in accordance with this invention showing a portion of the path of travel of the wiping strips.

As the wiper strips 76 fall off the rear portion of the car just prior to passing around the third sprocket wheel 58, the wiper strips have a tedency to move forward and tangle with the wiper strips which have just passed the third sprocket wheel 58. The path which the wiper strips tend to take as they leave the car is shown by the dotted lines 124 in FIG. 7. To prevent this tangling and to properly position the wiper strips for entry into the wringer assembly 32, it is preferable to mount a wiper strip guide cylinder 118 extending below the third sprocket wheel 58. The wiper strip guide 118 is mounted on a lower surface 58a of the sprocket wheel 58 with the cylindrical axis of the wiper strip guide 118 being coaxial with the rotational axis of the third sprocket wheel 58 and the diameter of the wiper strip guide 118 being smaller than the diameter of the sprocket wheel 58. The wiper strips 76 strike the wiper strip guide 118 as they leave the car and are directed outboard around the wiper strip guide 118, thereby becoming properly aligned for entry into the wringer assembly 32. A similar guiding and alignment of the wiper strips 76 is accomplished prior to their entry into the wringer assembly 36 by a guide member 120. The guide member 120 is attached to opposite sides of a second horizontal beam 122 which is attached to the upper ends 30a and 34a of the L-shaped members 30 and 34. A first end 120a of the guide member 120 is attached to a first side of the second horizontal beam 122 and is curved around the upper end 34a of the L-shaped member 34. A second end 120b is attached to a second opposing side 122b of the second horizontal beam 122. The guide member 120 is curved such that, when viewed in plan, it follows the curvature of the sprocket wheel 54.

Although a preferred embodiment of the dry wiping apparatus has been described and illustrated, it will be appreciated by those skilled in the art that several changes can be made in the embodiments of the invention without departing from the spirit and scope of the invention as indicated by the following claims.

The embodiments of the invention in which an exclusive property or privelege is claimed are as follows:

1. An automobile dry wiping apparatus for use in a mechanized car wash establishment through which automobiles are moved along a defined path, said apparatus comprising:
   a plurality of elongated wiper strips;
   elongated endless circulating carrier means;
   individual mounting means for said strips, suspending said strips from said carrier means at successive locations along said carrier means;
   means supporting, driving and guiding said carrier means to move in a defined substantially horizontal circuitous path overlying and extending transversely beyond opposite sides of said defined automobile path, those portions of said circuitous path along which the wiper strips are positioned to move in wiping contact with an automobile advancing along its defined path being so oriented relatively as to advance said wiper strips with a component of motion that is directed opposite the advancement of the automobile.

2. The apparatus defined in claim 1 wherein the carrier means is guided in a substantially triangular path, two sides of said triangular path defining two traversing sweeps, each sweep extending transversely beyond opposite sides of said path being angled oppositely in relation to the direction of advancement of the automobile.

3. The apparatus defined in claim 2 wherein the mounting means for the wiper strips supports the same substantially overlapped and oriented in substantially parallel relationship when executing said traersing sweeps.

4. An automobile dry wiping apparatus for use in a mechanized car wash establishment through which automobiles are moved along a defined path, said apparatus comprising:
   a plurality of elongated wiping strips;
   elongated endless circulating carrier means;
   individual mounting means for said strips, suspending said strips from said carrier means at successive locations along said carrier means;
   means supporting, driving and guiding said carrier means to move in a defined substantially horizontal circuitous path overlying and extending transversely beyond opposite sides of said defined automobile path, those portions of said circuitous path along which the wiper strips are positioned to move in wiping contact with an automobile advancing along its defined path being so oriented relatively as to advance said wiper strips with a component of motion that is directed opposite the advancement of the automobile, said mounting means supporting said wiper strips substantially overlapped and oriented in substantially parallel relationship when in wiping contact with said automobile, said mounting means and said carrier means cooperating to effect fanning out of the wiper strips while moving in those portions of the circuitous path beyond the sides of said defined automobile path;
   wringer means operatively engaging said wiper strips in successive order as they fan out in said circuitous path movement.

5. The apparatus defined in claim 4 wherein the wiper strips include absorbent strips secured to the lower ends of relatively heavy suspender strips.

6. The apparatus defined in claim 5 wherein the mounting means comprises cantilever arms projecting from the carrier means and supporting the suspender strips.

7. The apparatus defined in claim 6 wherein the carrier means comprises a chain having successive elongated links to which said cantilever arms are fastened in projecting relationship extending from, and not more than a few degrees out of parallel with, said links respectively, said guide means including sprocket means around which said chain turns and in so doing fans out the cantilever arms supporting said suspender strips.

8. An automobile drying apparatus for use in a mechanized car wash establishment through which automobiles are moved along a defined path, said apparatus comprising;
   an endless chain, having successive elongated links;
   a frame for holding said chain above the path of the auto such that said chain is free to move circuituously in a substantially horizontal plane, the circuit of said chain generally describing a triangle with two sides angled oppositely to said path and extending laterally beyond the sides of said path;

a plurality of wiper trips of flexible, water absorbent material;

means for suspending said strips from successive links of said chain along the length of said chain;

means for moving said auto along said defined path; and, means for driving said chain along said triangular circuit in a direction such that, as said chain moves along said triangle sides across the path of the auto, a component of motion of said chain is in a direction opposite the direction of advancement of the auto along said defined path.

9. The apparatus of claim 8 further including wringer means located adjacent the path of the auto for dewatering said water absorbent wiper strips.

10. The apparatus of claim 9 wherein said wringer means comprises cooperating wringer rollers; means for mounting said ringer rollers in a generally upright, parallel position stationed adjacent the path of the automobile; strip guide means so positioned and formed as to lead said water absorbent wiper strips into the wringer rollers after said strips have been drawn across the automobile; and means for driving said wringer rollers.

11. The apparatus of claim 10 further including pressurized water spray nozzle means disposed adjacent said wringer rollers to wet said water absorbent wiper strips immediately before they enter the nip of the rollers.

12. The apparatus of claim 8 wherein said wiper strips comprise chamois-like sheets of material.

13. The apparatus of claim 12 further comprising relatively heavy, suspender strips of flexible material connected directly to said chain, the lower ends of said supporting strips being detachably connected to said wiper strips.

14. The apparatus of claim 13 wherein said suspender strips have a first end formed into a loop and further including a plurality of cantilever arms attached to alternate links of said chain and extending therefrom not more than a few degrees out of parallel with said links, said suspender strips being attached to said chain by sliding said looped ends of said suspender strips over said cantilever arms.

15. The apparatus of claim 13 herein said suspender strips have a first end formed into a loop and further including a plurality of tubes, each one of said tubes being inserted within said looped end of an associated one of said suspender strips;

a plurality of cables, each of which is inserted through an associated one of said tubes; and, clamping means for clamping the ends of each of said cables to a different one of said chain links.

16. The apparatus of claim 13 wherein said lower ends of said suspender strips are formed into loops, each of said loops having an opening formed therein intermediate the ends of said loops and further including a supporting rod inserted into each of said loops, said wiper strips being looping over said rod and supended therefrom through said opening.

17. The apparatus of claim 16 wherein said opening is an elongate slot, oriented transversely to said strip.

* * * * *

UNITED STATES PATENT AND TRADEMARK OFFICE
CERTIFICATE OF CORRECTION

PATENT NO. : 4,166,303
DATED : September 4, 1979
INVENTOR(S) : Richard H. Fromme It is certified that error appears in the above-identified patent and that said Letters Patent are hereby corrected as shown below:

Column 2, line 30: "srung" is changed to --wrung--.

Column 3, line 16: "attahced" is changed to --attached--.

Column 5, line 29: "o" is changed to --to--.

Column 8, line 13: "traersing" is changed to --traversing--.

Column 9, line 4: "trips" is changed to --strips--.

Signed and Sealed this

Fourth Day of December 1979

[SEAL]

Attest:

SIDNEY A. DIAMOND

Attesting Officer     Commissioner of Patents and Trademarks